United States Patent
Brown et al.

(10) Patent No.: US 9,211,772 B2
(45) Date of Patent: Dec. 15, 2015

(54) VEHICLE TOWING APPARATUS AND METHOD OF TOWING A VEHICLE IN A TEST

(71) Applicant: Ford Global Technologies, LLC, Dearborn, MI (US)

(72) Inventors: Bradley Allen Brown, Leonard, MI (US); Timothy Bickes, Dryden, MI (US); Jeffrey Smith, Attica, MI (US); Donald R. Strange, Allenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 13/906,739

(22) Filed: May 31, 2013

(65) Prior Publication Data

US 2014/0353943 A1    Dec. 4, 2014

(51) Int. Cl.
*B60D 1/18* (2006.01)
*B60D 1/26* (2006.01)

(52) U.S. Cl.
CPC ... *B60D 1/26* (2013.01); *B60D 1/18* (2013.01)

(58) Field of Classification Search
CPC .............. B60D 1/00; B60D 1/36; B60D 1/04; B60D 1/02; B60D 1/18; B60D 1/26
USPC .............. 280/480, 433, 420, 446.1, 449, 450, 280/453, 509, 504, 512
See application file for complete search history.

(56) References Cited

U.S. PATENT DOCUMENTS

| | | | | |
|---|---|---|---|---|
| 2,425,309 A | * | 8/1947 | Ennis | 280/504 |
| 2,478,591 A | * | 8/1949 | Miller | 280/477 |
| 2,491,373 A | * | 12/1949 | Goff | 280/508 |
| 2,673,096 A | * | 3/1954 | Bendtsen | 280/504 |
| 3,542,398 A | * | 11/1970 | Melroe | B60D 1/38 280/477 |
| 3,881,751 A | * | 5/1975 | Colby | B60D 1/185 242/377 |
| 3,889,979 A | * | 6/1975 | Schmiesing | 172/272 |
| 4,225,149 A | * | 9/1980 | Koopman | 280/477 |
| 4,368,899 A | * | 1/1983 | Smalley et al. | 280/477 |
| 4,826,197 A | * | 5/1989 | Heinzen | 280/414.1 |
| 4,962,945 A | * | 10/1990 | Vannoy et al. | 280/508 |
| 5,183,284 A | * | 2/1993 | Paplinski | 280/508 |
| 5,263,733 A | * | 11/1993 | Kastenberger et al. | 280/414.1 |
| 5,346,239 A | * | 9/1994 | Wohlhuter | 280/420 |
| 5,873,595 A | | 2/1999 | Hinte | |

(Continued)

FOREIGN PATENT DOCUMENTS

| | | |
|---|---|---|
| CN | 202053849 | 11/2011 |
| DE | 4124974 | 1/1993 |

OTHER PUBLICATIONS

SAE International, Surface Vehicle Recommended Practice, Road Load Measurement Using Onboard Anennometry and Coastdown Techniques, J2263 Dec. 2008, pp. 1-12.

*Primary Examiner* — Tony Winner
(74) *Attorney, Agent, or Firm* — Raymond L. Coppiellie; Brooks Kushman P.C.

(57) ABSTRACT

A vehicle tow bar assembly having a latch assembly and a remotely operated actuator for unlatching the tow bar assembly from a tow line. The latch assembly may have a pivot lever that is retained by a latch pin until released. Alternatively, the latch assembly may have a pair of jaws that are opened by a linear motor and a set of cams. A method of towing a vehicle with a tow bar assembly that is unlatched and released when the vehicle is moving at a selected speed in a test procedure.

12 Claims, 5 Drawing Sheets

(56) References Cited

U.S. PATENT DOCUMENTS

| | | | |
|---|---|---|---|
| 6,474,676 B1 * | 11/2002 | Palaia | B60D 1/065 280/480 |
| 6,634,666 B2 | 10/2003 | Shilitz et al. | |
| 6,752,412 B2 * | 6/2004 | Saul | B60D 1/18 280/457 |
| 7,182,362 B2 * | 2/2007 | Yeakel | 280/433 |
| 7,552,938 B1 | 6/2009 | Williams, Jr. | |
| 7,845,669 B2 * | 12/2010 | Yeh | B60D 1/182 280/457 |
| 2012/0191270 A1 | 7/2012 | Floyd | |

* cited by examiner

VEHICLE TOWING APPARATUS AND METHOD OF TOWING A VEHICLE IN A TEST

TECHNICAL FIELD

This disclosure relates to vehicle towing apparatus latch mechanisms and a method of towing a vehicle in a test procedure.

BACKGROUND

Vehicles are tested extensively for many different performance characteristics such as fuel economy, aerodynamic drag, noise, vibration and harshness, and for many other reasons. Tests developed over the years for internal combustion powered vehicles resulted in establishing standards that are now being applied to hybrid vehicles, partial hybrid vehicles and electric vehicles. Normal vehicle sign-off procedures require verification of drive times, speeds, and loads that may be outside the normal operating capabilities of most electric vehicles. Test engineers may also need to disengage from the tow vehicle to allow for "free maneuvers" or unique drive evaluations. There is also a need to allow drivers of towed and towing test vehicles to release and steer clear of each other in case of emergency.

Land vehicles are tested for aerodynamic drag and mechanical drag in a test that is known as a "Certification Coast Down Test" that is specified in SAE J2263 DEC2008. The Certification Coast Down Test requires vehicles to be towed at unusually high speeds (over 115 km/h) for extended periods of time. In the Coast Down Test, a vehicle is normally driven to reach a speed of 115 km/h at which point internal combustion powered vehicles are shifted to neutral and allowed to coast until a speed of 15 km/h is reached. The time required to coast until reaching the lower speed is measured and analyzed.

Drivetrains of hybrid vehicles and electric vehicles are difficult, or impossible, to disconnect while the vehicles are moving. Hybrid vehicles and electric vehicles cannot use their own drivetrain to accelerate the vehicle to the desired speed to start the test because the electrical portion of the drivetrain cannot be completely disconnected while the vehicle is moving. One way to accelerate hybrid and electric test vehicles is to push the vehicles from the rear but this approach may damage the test vehicle and it is difficult to control. Towing such vehicles to reach the desired speed is unacceptable because the towing vehicle may interfere with the test results by disturbing the air flow around the test vehicle. The towing cable, if not released from the towed vehicle, may interfere with the test results.

Glider aircraft are normally towed to reach a desired altitude and are released by a cable release mechanism. This approach to releasing a towed glider is simple and effective but requires a cable guide system and can only be operated by the pilot of the towed or towing aircraft.

This disclosure addresses one or more of the above problems and other problems as summarized below.

SUMMARY

According to one aspect of this disclosure, a tow bar assembly is disclosed for a land vehicle that may be remotely released. The tow bar assembly includes a tow bar that is attached to the towed vehicle. The tow bar supports a latch assembly that has a latched position and an unlatched position. An actuator is operatively connected to the latch assembly for shifting the latch assembly from the latched position to the unlatched position. A switch is disposed in a remote location relative to the latch assembly for controlling the actuator.

According to another optional aspect of this disclosure, the latch assembly may further comprise a pivot link attached to the tow bar that is selectively pivoted from the latched position to the unlatched position. A latch pin engages the pivot arm to hold the pivot arm in the latched position. The latch pin is moved out of engagement with the pivot arm by the actuator in the unlatched position.

Alternatively, the tow bar assembly may further comprise a pair of jaws operatively connected to the tow bar that pivot between a latched position and an unlatched position. At least one of the jaws may have a reaction cam surface that is engaged by a linear motor having at least one cam surface that is driven into the reaction cam surface to shift the latch assembly from the latched position to the unlatched position.

In another alternative embodiment, the tow bar assembly may further comprise a first jaw and a second jaw that are operatively connected to the tow bar to pivot between a latched position and an unlatched position. The first jaw has a first reaction cam surface and the second jaw has a second reaction cam surface. A linear motor having a first cam surface is driven into engagement with first reaction cam surface and a second cam surface that is driven into the second reaction surface to shift the latch assembly from the latched position to the unlatched position.

The tow bar assembly may further comprise a communication link operatively connecting the switch to the actuator to provide an unlatch signal to the actuator when the switch is operated. The communication link may be either a radio frequency signal or an electrical wire.

The tow bar assembly may include an actuator that may be a magnetic plunger, a solenoid, or a linear motor.

The tow bar assembly may further comprise a transmitter operatively connected to and operated by the switch, and a receiver that is operatively connected to the actuator. The transmitter sends a radio frequency signal to the transmitter to shift the actuator from the latched position to the unlatched position.

The tow bar assembly may also further comprise a first portion of the tow bar that is attached to the vehicle and a second portion of the tow bar that supports the latch assembly. The first portion of the tow bar and the second portion of the tow bar may be connected by a pivot connector.

Another aspect of this disclosure relates to a method of towing a vehicle in a test with a towing vehicle using a remotely controlled tow hitch latch on the towed vehicle. The method comprises attaching a flexible strand between the towing vehicle and the tow hitch. Towing the towed vehicle until a selected speed is reached and actuating a switch that is remote from the tow hitch. The flexible strand is released from the tow hitch in response to actuating the switch while the towed vehicle is moving at the selected speed.

According to other aspects of this method, the method may further comprise measuring the road load force as a function of speed during operation of a vehicle during coast down. The road load force may include aerodynamic drag and mechanical drag as a function of vehicle speed.

According to the method, the switch may be actuated from the towed vehicle, from a stationary location on a test track, or from the towing vehicle.

The above aspects of this disclosure will be described below in greater detail with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
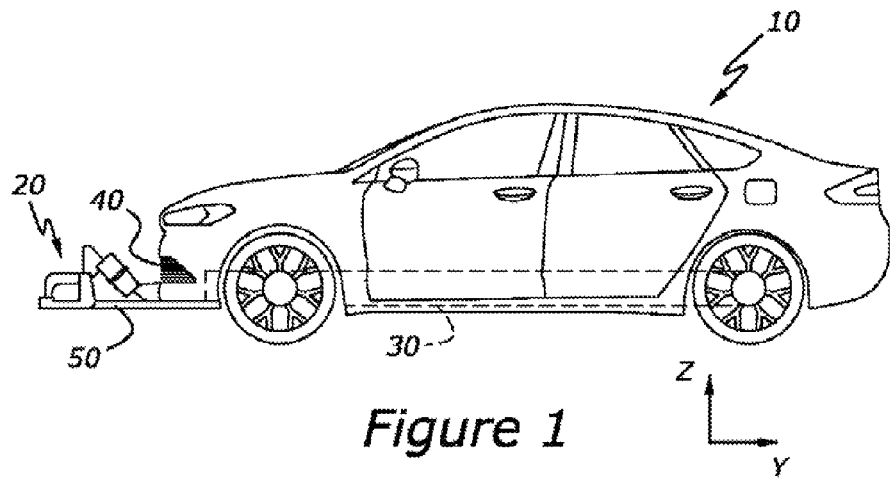
FIG. 1 is a side elevation view of a towed vehicle with a tow assembly attached to the front end of the vehicle.

Referring now to FIG. 1, a vehicle 10 is illustrated that has a tow assembly 20 attached to the frame of a towed vehicle 10. The illustrated vehicle 10 is a hybrid-electric sedan, but the tow assembly 20 may be configured for use in any type of motor vehicle including, e.g., sedans, pick-up trucks, vans, SUVs, electric or hybrid-electric vehicles. The tow assembly 20 is mounted at a front end of the vehicle 10 to a part of the frame 30 of the vehicle near a front fascia 40. Tow assembly 20 includes a tow bar 50 that is attached to the vehicle main frame 30.

Figure 2:
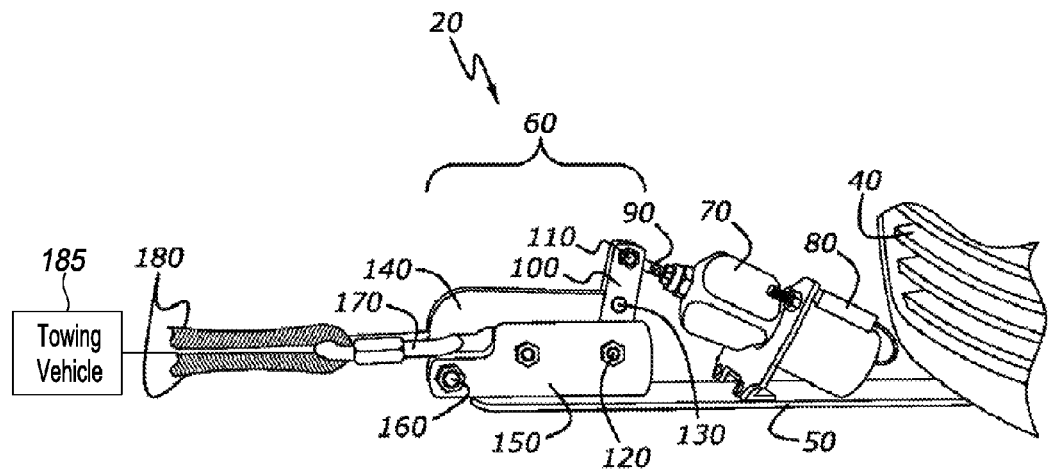
FIG. 2 is a side elevation view of the tow assembly shown in FIG. 1 in a latched position.

Referring to FIG. 2, the tow assembly 20 is shown to include a latch assembly 60. The latch assembly 60 is connected to a remotely controllable actuator 70. Actuator 70 includes a solenoid, magnetically actuated plunger, or linear motor that is electrically linked to a vehicle battery (not shown) or other electrical source. A receiver-transmitter 80 is provided at the top of the actuator 70 for receiving a release command for releasing the latch assembly 60. Actuator 70 includes a rod 90 that is attached to a rotatable link 100 by a fastener 110. Link 100 rotates with respect to the lateral axis of the vehicle about a fastener 120. Link 100 includes a pin 130 that extends through the link 100. A pivot arm 140 is shown in a latched position in FIG. 2. Pivot arm 140 (or "swing away bar") is pivotally attached to a base 150 of the tow assembly 20 to pivot about point 160. A ring 170 is attached to a pivot arm 140 and linked to a strap 180 that is attached to a towing vehicle 185.

Figure 3:
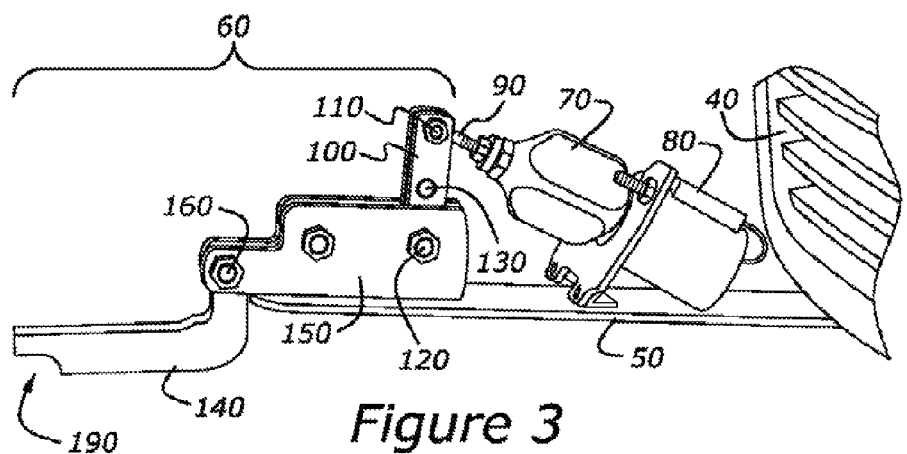
FIG. 3 is a side elevation view of the tow assembly shown in FIG. 1 in an unlatched position.

Referring to FIG. 3, latch assembly 60 is shown in an open position with the pivot arm 140 rotated approximately 180° counterclockwise with respect to the closed position shown in FIG. 2. Ring 170, as shown in FIG. 2, is pulled off of the pivot arm 140 when latch assembly 60 is in the open position. Referring to FIG. 3, pivot arm 140 includes a notch 190 at one end that forms a seat on the pivot arm 140 for a pin 130. The pin 130 holds the pivot arm 140 in the closed position.

Figure 4:
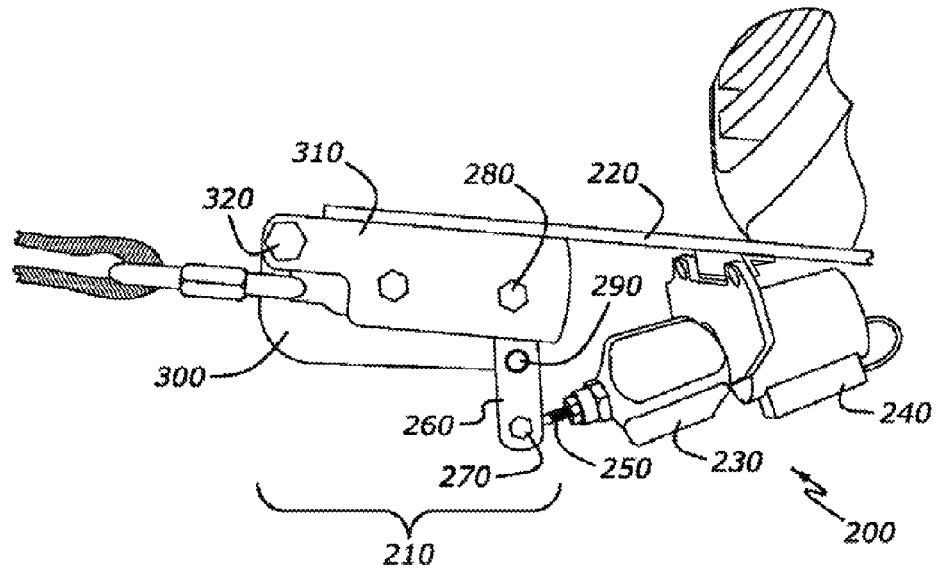
FIG. 4 is a side elevation view of an alternative embodiment of a tow assembly in a latched position.

Referring to FIG. 4, another example of a tow assembly 200 is illustrated that includes a latch assembly 210. Latch assembly 210 is mounted to a lower side of a mounting bracket 220. Latch assembly 210 is linked to a remotely controlled actuator 230. Actuator 230 in this embodiment is a magnetic plunger, or solenoid. Actuator 230 is electrically linked to a battery. A receiver-transmitter 240 is operatively connected to the actuator 230 for receiving a command to release the latch assembly 210. Actuator 230 includes a piston 250 that is pivotally connected to a pivotable link 260 by a pivot pin 270, or fastener. Link 260 pivots with respect to the lateral axis of the vehicle about a pivot pin 280, or fastener. Clevis link 260 includes a pin 290 that extends in the lateral direction across the clevis link 260. A pivot arm 300 is shown in a latched or locked position. Pivot arm 300 is attached to a base 310 of the tow assembly 200 to pivot about pivot pin 320. A ring similar to the ring 170 shown in FIG. 2 is received on pivot arm 300 and is linked to a strap that is attached to a towing vehicle.

Figure 5:
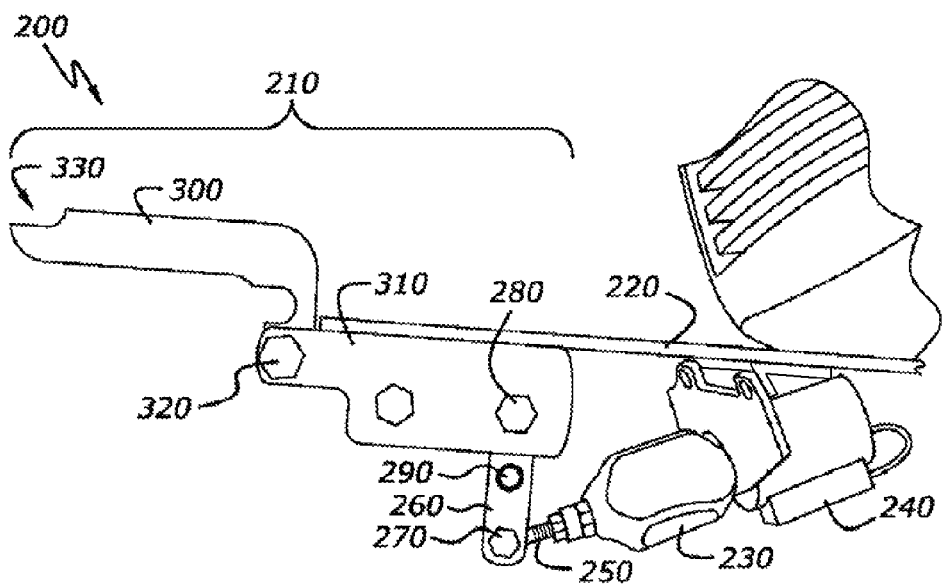
FIG. 5 is a side elevation view of the tow assembly of FIG. 4 in an unlatched position.

Referring to FIG. 5, latch assembly 210 is shown in an open position. Pivot arm 300 is rotated 180 degrees clockwise with respect to the latched position. Ring 170, as shown in FIG. 2, is pulled open or drops down away from pivot arm 300 when latch assembly 210 is in the open position. Pivot arm 300 includes a notch 330 formed at one end. Notch 330 assists in securing the end of pivot arm 300 receives the pin 290 in a notch 330 when in the latched position, as shown in FIG. 4.

Figure 6:
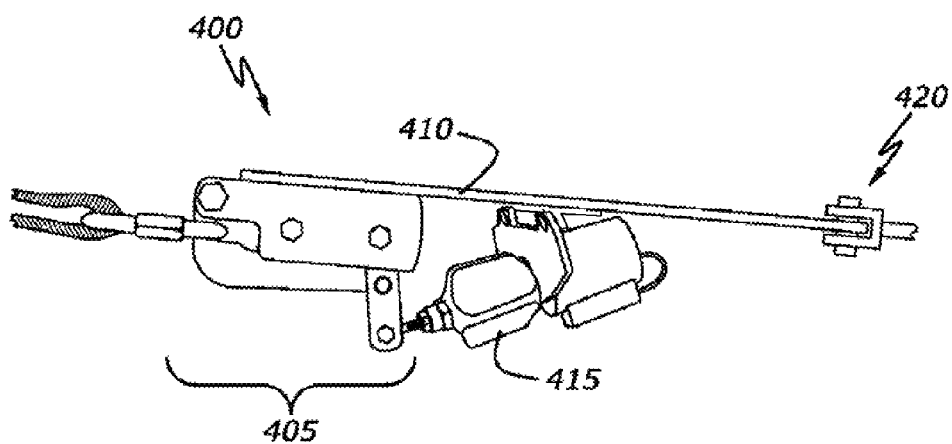
FIG. 6 is side elevation view of another embodiment of a tow assembly that includes a pivot connection on the tow bar in a latched position.

Another example of a tow assembly 400 is illustrated in FIG. 6. A latch assembly 405 that is similar to the latch assemblies shown in FIG. 1-5 is attached to a magnetic plunger 415, or solenoid, that actuates the tow assembly. Mounting bracket 410 is attached to the towed vehicle frame 30 and is linked to a pivot joint 420. The pivot joint 420 adds a degree of freedom that allows the towed vehicle to maneuver laterally with respect to the towing vehicle.

Figure 7:
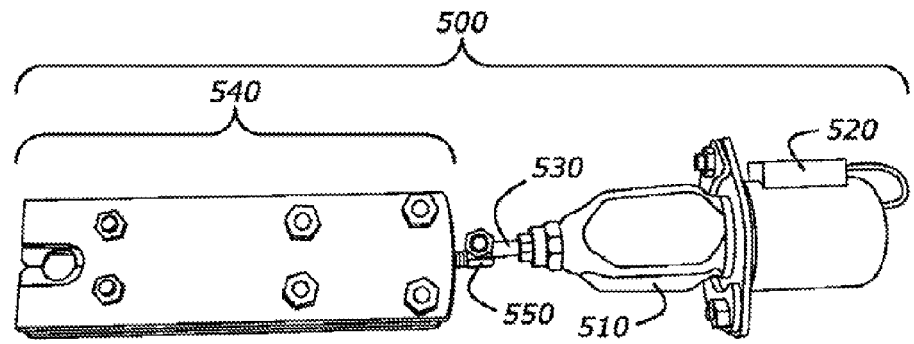
FIG. 7 is side elevation view of another embodiment of a tow assembly in a latched position.
Figure 8:
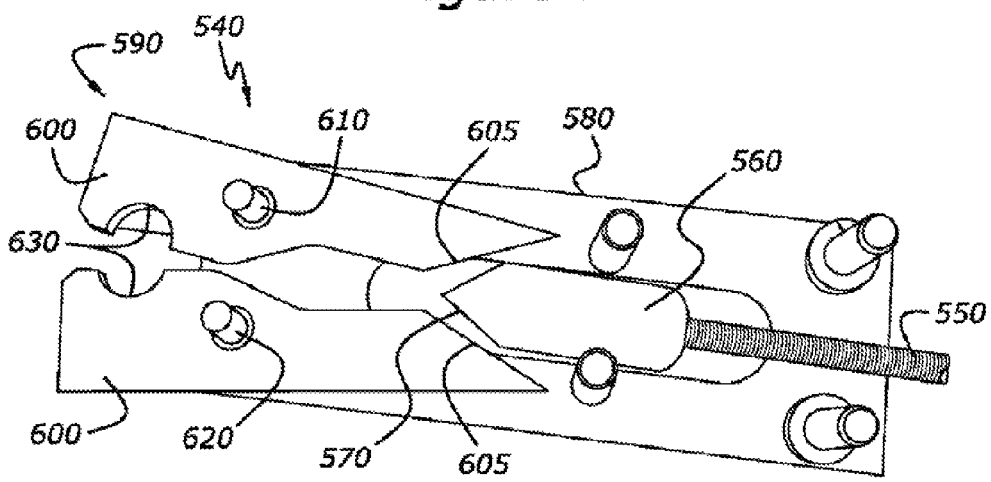
FIG. 8 is a partial cut-away side elevation view of the tow assembly of FIG. 7 in an unlatched position.
Figure 9:
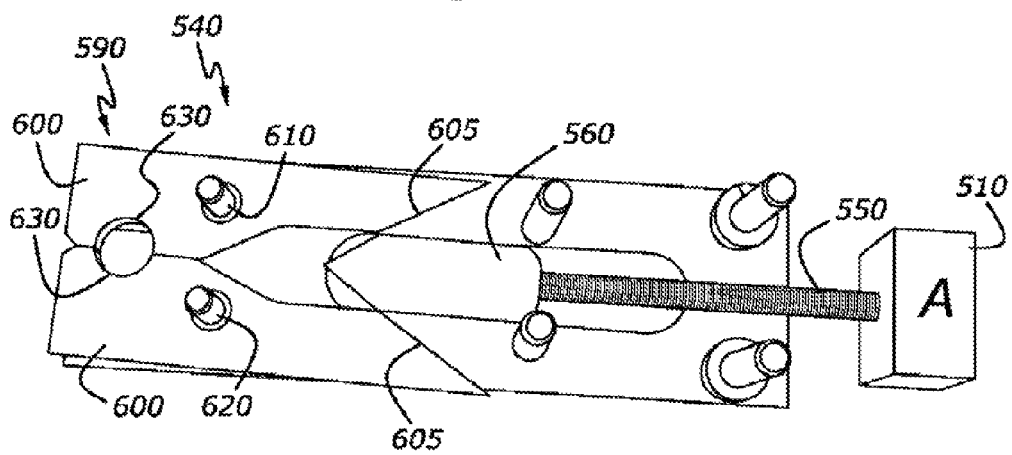
FIG. 9 is a partial cut-away side elevation view of the tow assembly of FIG. 7 in a latched position.

Referring to FIGS. 7-10, another embodiment of a vehicle tow assembly 500 is illustrated that includes an actuator 510. The actuator 510 may be a magnetic actuator, a solenoid, a linear motor or a rotary actuator. Actuator 510 may include a receiver-transmitter 520 that communicates with a remotely located transmitter. A rod 530 is linked to a push rod 550 of a latch assembly 540. Push rod 550 includes a head 560 with a tapered distal end 570. Push rod 550 and head 560 are received in the latch assembly 540 that includes a jaw assembly 590 attached to one end. Tow assembly 590 includes a set of pivoting jaws 600 that are attached to latch assembly 580 by pivot pins 610 and 620. Each jaw 600 includes a semi-circular recess 630 at a distal end of the jaws 600. When the push rod 550 is fully inserted in the latch assembly 580, the jaws 600 are aligned with the push rod in a locked position. When in the locked position, as shown in FIG. 9, the recesses 630 may be latched to a ring 170, similar to the ring shown in FIG. 2, or other connector.

As shown in FIG. 8, when the push rod 550 is retracted from the latch assembly 580, the jaws 600 are opened to a release position. Jaws 600 include a cam surface 605 that converts the linear movement of push rod 550 into pivotal movement of the jaws 600.

Figure 10:
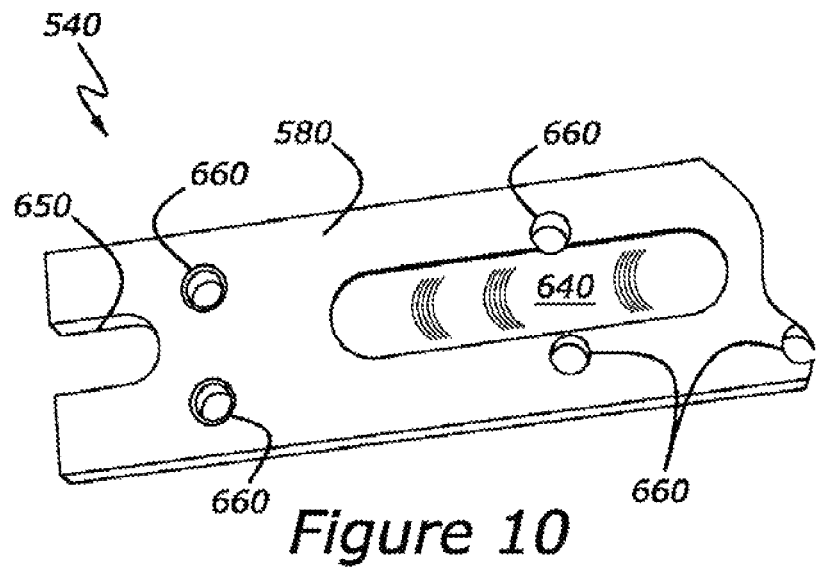
FIG. 10 is a fragmentary side elevation view of one wall of the tow assembly of FIG. 7.

Referring to FIG. 10, one wall of the latch assembly 580 includes a recessed guide track 640 for the head 560 (as shown in FIGS. 7-9). Guide track 640 is an oblong recess formed in an inner surface of the housing. The head 560 of the push rod 550, as shown in FIGS. 8-9, slides within guide track 640. A slot 650 is provided in each side plate of the latch assembly to assure that the ring 170 does not hang-up on the jaws 600. Latch assembly 580 includes a series of orifices 660 that receive fasteners or pins for attaching the jaws 600 to the housing and hold the latch assembly 580 together.

Figure 11:
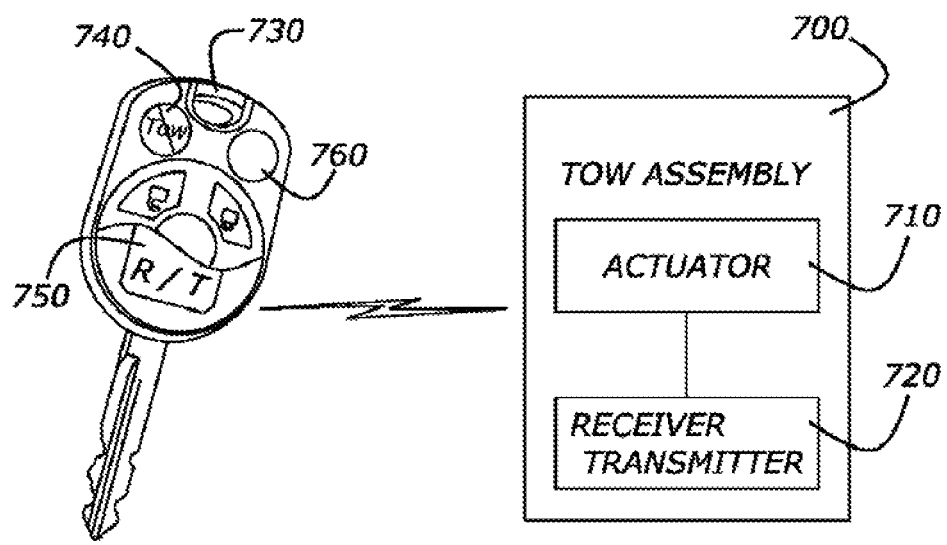
FIG. 11 is a schematic diagram of a set of transmitters and receivers for remotely operating the tow assembly.

The illustrated tow assemblies may be remotely actuated by the driver of the towed vehicle or the towing vehicle. Alternatively, the tow assembly may be remotely actuated by a sensor associated with a location on a test track. A schematic illustration of a receiver-transmitter for actuating the tow assemblies is shown in FIG. 11. A tow assembly 700 includes an actuator that is linked to a receiver-transmitter 720. Actuator 710 is configured to control a latch assembly, e.g., 60, 210, 405, or 540 as previously described with reference to FIGS. 2-10. Receiver-transmitter 720 is configured to receive a release command from a key fob 730. Key fob 730 includes a release switch 740 labeled with a circle and a crossed out "TOW" in this embodiment. Key fob 730 also includes a receiver-transmitter 750. When the actuator 710 is actuated to release the latch of tow assembly 700, a configuration signal may be sent to the receiver-transmitter 750 in the key fob 730. Upon receipt of the confirmation signal, an indicator light 760 is illuminated.

In other embodiments, the release button and/or indicator can be located in other devices, e.g., on the instrument panel for the towed or towing vehicle, in a control tower or on a laptop computer.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tow bar assembly for a land vehicle comprising:
   a tow bar attached to the vehicle;
   a latch assembly supported by the tow bar and having a latched position and an unlatched position, the latch assembly including a pivot arm attached to the tow bar, and a pivot link pivotally connected to the tow bar that includes a latch pin that engages the pivot arm to hold the pivot arm in the latched position, and wherein the latch pin is moved out of engagement with the pivot arm by the pivot link that is pivoted by an actuator to shift the pivot arm from the latched position to the unlatched position, wherein the actuator is operatively connected to the latch assembly for shifting the latch assembly from the latched position to the unlatched position; and
   a switch disposed in a remote location relative to the latch assembly for controlling the actuator.

2. The tow bar assembly of claim 1 further comprising a communication link operatively connecting the switch to the actuator to provide an unlatch signal to the actuator when the switch is operated.

3. The tow bar assembly of claim 2 wherein the communication link is selected from a group consisting of:
   a radio frequency signal; and
   an electrical wire.

4. The tow bar assembly of claim 1 wherein the actuator is selected from a group consisting of:
   a magnetic plunger;
   a solenoid; and
   a linear motor.

5. The tow bar assembly of claim 1 further comprising:
   a transmitter operatively connected to and operated by the switch; and
   a receiver operatively connected to the actuator, wherein the transmitter sends a radio frequency signal to the transmitter to shift the actuator from the latched position to the unlatched position.

6. The tow bar assembly of claim 1 wherein the tow bar further comprises a first portion of the tow bar attached to the vehicle and a second portion of the tow bar supports the latch assembly, and wherein the first portion of the tow bar and the second portion of the tow bar are connected by a pivot joint to facilitate lateral maneuverability of the vehicle.

7. A towing apparatus comprising:
   a tow bar;
   a latching arm attached to the tow bar that pivots from a latched position to an open position;
   a strap attachable to a towing vehicle; and
   a ring attached to the strap and directly secured to the latching arm in the latched position, the ring falls away when the latching arm is released to the open position while towing a vehicle disconnecting the ring from the latching arm.

8. The towing apparatus of claim 7 wherein the ring disconnects from the latching arm regardless of whether a load is applied to the ring.

9. The towing apparatus of claim 7 wherein the latching arm is secured to a base by a pivot pin disposed at a front portion of the base and a pivot link disposed at a rear portion of the base, wherein the pivot link is triggered by an actuator to release the latching arm.

10. The towing apparatus of claim 9 wherein the latching arm pivots 180 degrees when the pivot link releases the latching arm.

11. The towing apparatus of claim 7 wherein the latching arm is attached to an upper side of the tow bar.

12. The towing apparatus of claim 7 wherein the latching arm is attached to a lower side of the tow bar and wherein gravity acts upon the latching arm to facilitate moving the latching arm to the open position.

\* \* \* \* \*